(12) United States Patent
Wilmot

(10) Patent No.: US 6,243,464 B1
(45) Date of Patent: Jun. 5, 2001

(54) QUICK ATTACHMENT AND RELEASE MOUNTING BRACKET FOR CELLULAR TELEPHONE APPLICATIONS

(75) Inventor: Eric Wilmot, Chicago, IL (US)

(73) Assignee: Andrew Corporation

( * ) Notice: Subject to any disclaimer, the term of this patent is extended or adjusted under 35 U.S.C. 154(b) by 0 days.

(21) Appl. No.: 09/224,155

(22) Filed: Dec. 31, 1998

(51) Int. Cl.[7] .................................................. H04M 1/00
(52) U.S. Cl. ............................................................ 379/454
(58) Field of Search ................................... 379/454, 446, 379/455, 447

(56) References Cited

U.S. PATENT DOCUMENTS

| | | |
|---|---|---|
| 1,015,034 * | 1/1912 | Lapicki ................................ 379/454 |
| 1,194,746 | 8/1916 | Keeler . |
| 1,333,523 | 3/1920 | Williams . |
| 2,334,557 | 11/1943 | Howard . |
| 3,521,349 | 7/1970 | Gehring . |
| 3,748,409 * | 7/1973 | Stokes ................................ 379/454 |
| 5,392,350 | 2/1995 | Swanson . |
| 5,606,608 | 2/1997 | Krutke . |

\* cited by examiner

*Primary Examiner*—Jack Chiang
(74) *Attorney, Agent, or Firm*—Vedder Price Kaufman & Kammholz

(57) ABSTRACT

A user-friendly mounting element for mounting a cellular telephone to a vehicle without requiring permanent alteration of the vehicle is disclosed. The mounting element includes a hollow socket body having a hex opening formed in one end thereof that slips over the and engages a like configured seat anchor bolt. The other end of the socket body may be threaded so as to receive a flexible support element that extends vertically upward therefrom to support the telephone off of the floor of the vehicle. The socket body has a tapped opening that receives a screw that clamps the socket body to the seat anchor bolt.

20 Claims, 2 Drawing Sheets

QUICK ATTACHMENT AND RELEASE MOUNTING BRACKET FOR CELLULAR TELEPHONE APPLICATIONS

BACKGROUND OF THE INVENTION

The present invention relates generally to mounting brackets and mounting systems for cellular and mobile telephones, and more particularly to a quick attachment and release mounting bracket that is simple to use and operate.

The popularity of mobile, or cellular, telephone systems has increased tremendously over the past few years. Such cellular telephone systems typically have associated mounting hardware that is permanently mounted to a vehicle, such as a cradle or other type of receptacle. This requires a professional installation and also requires that the vehicle body be altered, such as by drilling holes in the sheet metal floor or the dashboard of the vehicle.

Installations of some other mounting system may be effected by the user. These mounting systems are more in the nature of contraptions, ranging from suction cups that are attached to either the dashboard or windshield of the vehicle to adhesive-backed mounting members. Due to the self-installation nature of these systems, they tend to be less stable. The placement of the mounting hardware in these types systems often hampers the ease and the visibility of the occupants and driver of the vehicle.

U.S. Pat. No. 5,392,350, issued Feb. 21, 1995 describes a flexible mount for a mobile telephone that has a baseplate that must be permanently mounted to a vehicle. A mounting bracket slidably engages the baseplate. Although the mounting bracket may be easily removed form the baseplate, bolt holes must still be drilled in the vehicle floor, which holes damage the vehicle. Such a mount cannot be moved from one vehicle to another with ease and without permanently damaging or modifying the structure of the vehicle.

A need therefore exists for a mounting bracket that can be easily installed and removed by a user without causing permanent damage to the vehicle.

SUMMARY OF THE INVENTION

The present invention is directed to a mounting assembly particularly suitable for use with mobile or cellular telephones that overcomes the aforementioned disadvantages. It is therefore a general object of the present invention to provide a mounting assembly for use with cellular and mobile telephones for mounting such a telephone to a vehicle which mounting assembly is simple to use and install, without permanently damaging the vehicle.

Another object of the present invention is to provide a mounting element that receives a support member for a cellular telephone and that may be easily attached and detached from existing hardware in the interior of a vehicle without permanently damaging any part of the vehicle structure.

It is a further object of the present invention to provide a mounting member that is selectively attachable to an existing element in the vehicle interior compartment, such as a vehicle seat anchor bolt, which mounting member may be repeatedly installed and uninstalled from a vehicle without permanently modifying any portion of the vehicle, and further wherein the mounting member includes a hollow socket having two opposing, open ends, one end being adapted to engage a seat anchor bolt of the vehicle and the other end being adapted to receive a telephone support element, the mounting member further having means for firmly affixing the one end of the socket member to the seat anchor bolt.

These objects and more are accomplished through different aspects of the structure of the present invention. In one principal aspect of the present invention and as disclosed in one embodiment thereof, a mounting member is provided that includes a hollow socket element. One end of the socket element is configured to slip over a vehicle seat anchor bolt and as such, preferably includes a hexagonal opening that is configured to receive therein a hexagonal anchor bolt protruding above the floor of the vehicle. The other end of the socket element includes a second opening that receives a support element to which the telephone is attached. The socket element further has a clamping screw associated therewith that extends through two opposing portions of the socket element sidewall. The opposing sidewall portion is threaded and receives the clamping screw so that when the clamping screw is tightened, the socket element sidewall portions are drawn together so that the socket element may, in effect, clamp the seat anchor bolt.

In another principal aspect of the present invention, the sidewall of the socket element may include one or more slots that facilitate the application of the one end to the seat anchor bolt. This slot also facilitates the clamping action of the socket element in that it defines a free space that may be closed upon tightening of the screw and thereby clamp the seat anchor bolt.

In another principal aspect of the present invention, and as exemplified in another embodiment of the present invention, the tightening screw is positioned at a preselected distance from the socket element one end at an elevation equal to almost the elevation of a vehicle anchor bolt above the vehicle floor so that the clamping screw opposes and engages the bolthead of the vehicle anchor bolt.

These and other objects, features and advantages of the present invention will become apparent from the following detailed description, taken in conjunction with the accompanying drawings, wherein like reference numerals refer to like parts.

DETAILED DESCRIPTION OF THE REFERRED EMBODIMENTS

The present invention is directed to a mounting assembly that is user friendly and which can be quickly attached to and removed from a vehicle without incurring permanent damage to the vehicle. This mounting assembly is particularly suitable for use with mobile, or cellular, telephones that are used within a vehicle. In this detailed description, the terms mobile telephone and cellular telephone will be used interchangeably to describe a telephone that may be mounted within the interior compartment of a vehicle.

Figure 1:
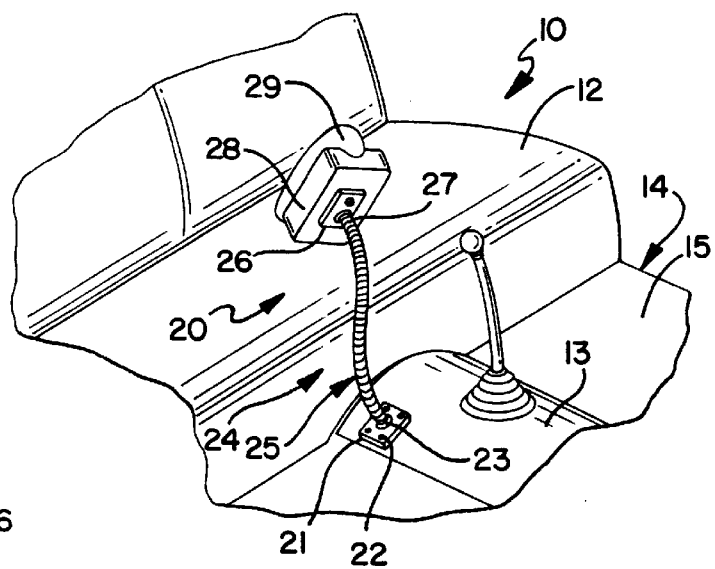
FIG. 1 is a perspective view of the interior of a vehicle illustrating a known telephone mounting system used to mount a mobile, or cellular, telephone to a vehicle.

FIG. 1, illustrates the interior compartment 10 of a vehicle (not shown) with a known telephone mounting assembly 20 that requires modification to the structure of the vehicle. The vehicle component 10 includes a set 12, a transmission hump 13 formed on or as part of the floor 14 of the vehicle and which is usually covered with carpet 15. This known mounting assembly 20 includes a base plate 21 that is attached to the vehicle floor 15 by way of bolts 22 that extend through holes drilled in both the baseplate 21 and the floor 14. The baseplate 21 has an opening 23 to which is attached an elongated, support member 24, shown as a flexible shaft 25 that extends up from the baseplate 21. This shaft 25 has a flat support plate 26 attached to its upper end 27 to which is bolted a telephone receptacle 28 that receives and cradles a telephone handset 29.

The holes that need to be drilled in the vehicle floor 14 to accommodate the bolts 22 can cause rust to form on the vehicle floor because they penetrate the rust protective coasting applied to the underside of the vehicle. This damage may lower the resale or trade-in price of the vehicle. This type of mounting assembly 20 also must be professionally installed and raises the expense thereof to its user. Additionally, this type mounting system may not be easily removed by the user to take with to a new or replacement vehicle.

Figure 2:
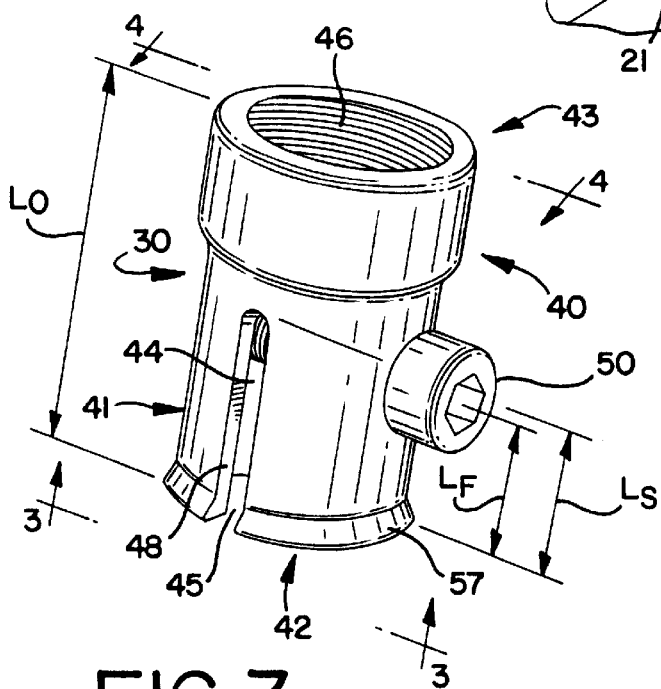
FIG. 2 is a perspective view of one embodiment of a mounting assembly constructed in accordance with the principles of the present invention.
Figure 5:
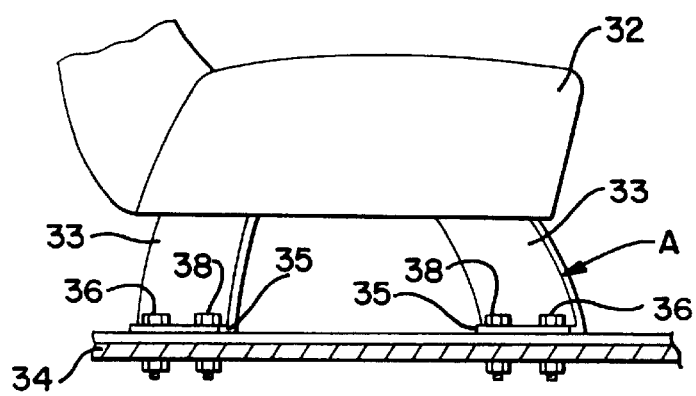
FIG. 5 is an elevational view, partly in section illustrating a vehicle seat and its anchor bolts.

The present invention provides a solution to this problem accordingly contemplates the use of an easily attachable and removable mounting assembly, indicated generally at 30 in FIG. 2. The mounting assembly 30 may be easily applied by a user with little or no mechanical skill, and which may be taken by the user from one vehicle to and installed in another vehicle without forming permanent modification to the structure of the vehicle. As illustrated in FIG. 5, the vehicle interior compartment includes one or more seats 32 having metal legs 33 that extend down to the vehicle floor 34 and terminate in flat baseplates 35. These seats 32 are attached to the vehicle floor 34 or frame at the factory by a series of anchor bolts 36. The anchor bolts 36 have boltheads 38 that lie on the surfaces of the seat leg baseplates 35 and which are accessible from the side of the seats 32 in the area "A" designated in FIG. 5.

The mounting assemblies 30 of the present invention are formed so as to engage these anchor bolts 36, and particularly the boltheads 38 thereof, to form a quick-release, but structurally stable mounting bracket to which a telephone support may be attached. Turning to FIG. 2, the mounting assembly 30 can be seen to include a cylindrical socket, or collar member 40, having a body portion 41 and opposing first and second ends, 42, 43, respectively. The collar member 40 of this embodiment includes first and second openings 45, 46 respectively located at the first and second ends 42, 43.

Figure 7:
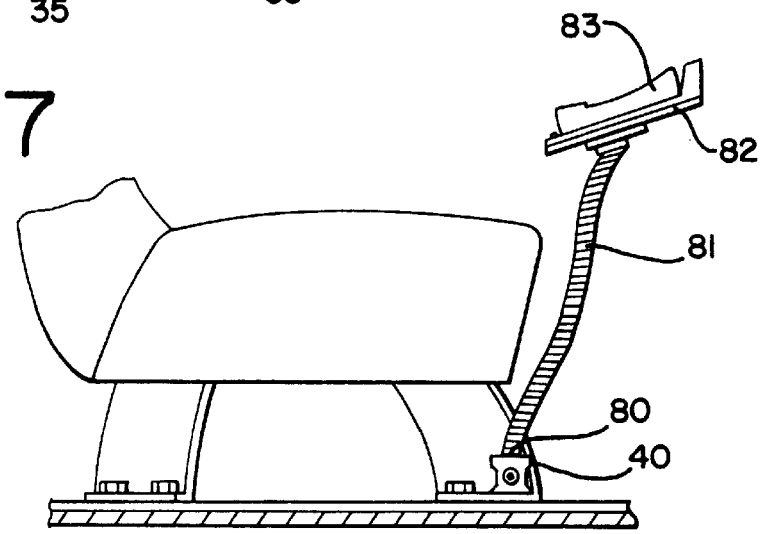

The second opening 46 is shown as configured with threads and is provided to engage the base end 80 of an elongated support member 81 that can extend upwardly to support a telephone module or a cradle 82 for hand-held cellular telephone 83. (FIG. 7.)

Figure 3:
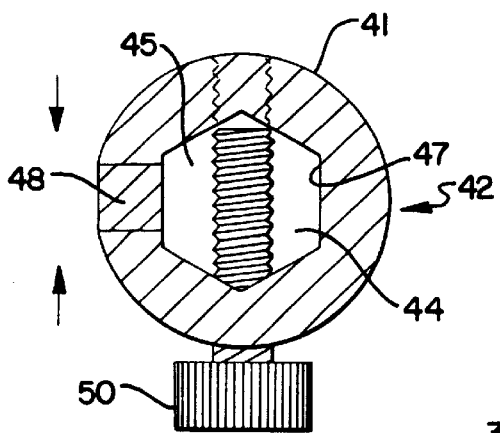
FIG. 3 is a bottom plan view of the mounting assembly of FIG. 2 taken along lines 3—3 thereof.

The first opening 45 of the collar first end 42 is configured to receive the bolthead 38 of a seat anchor bolt 36. In this regard, and as illustrated in the preferred embodiment of FIG. 3, the collar first opening 45 may have a complementary configuration to that of the anchor bolthead 38. This configuration is illustrated in FIG. 3 as hexagonal in shape, although other configurations, such as square, star or the like may also be used. It is desired that the inner dimensions of the first opening 45 are just very slightly larger than the outer dimensions of the boltheads 38 so that the inner walls 47 of the first opening 45 snugly engage the outer surfaces 39 of the bolthead 38, shown in phantom in FIG. 4.

In order to facilitate the application of the collar 40 to the anchor bolthead 38, the collar 40 includes a longitudinal slot 48 formed in another part of the collar sidewall portion. As seen in FIG. 2, this slot 48 extends for a preselected distance $L_s$ that is less than the overall length $L_o$ of the collar 40. As will be understood, this slot 48 will permit the sidewalls of the collar to flex slightly outwardly when the collar 40 is applied to the bolthead 38.

The mounting assembly 30 also includes a means for clamping the collar 40 in place on the bolthead 38. In the preferred embodiment of FIGS. 1–4, this clamping means is illustrated as a fastening screw 50 that passes through a first opening 51 formed in one sidewall portion of the collar and extends through the interior cavity 44 of the collar 40. This interior cavity 44 extends from the first end 42 of the collar 40 up to an intervening interior wall 89 that separates the two openings 45 and 46. The end 52 of the screw 50 engages a second, but threaded opening 54, that is formed in an opposing sidewall portion of the collar 40.

Figure 4:
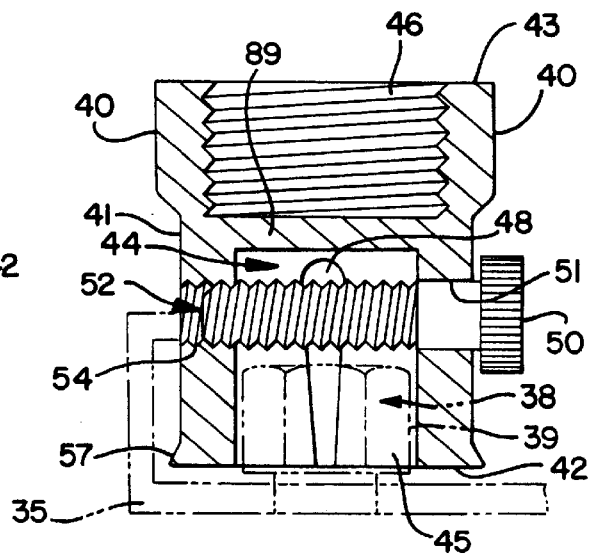
FIG. 4 is a vertical cross-sectional view of the mounting assembly of FIG. 2 taken along lines 4—4 thereof and illustrating in phantom, a vehicle anchor bolthead in place within an engaged by the mounting assembly.

This opening 54 may "deadhead" inside of its collar sidewall portion where the sidewall portion is relatively thick, or as illustrated in FIG. 4, may extend completely through the sidewall portion. The two openings 51 and 54 are oriented so that the slot 48 is angularly offset from an imaginary line drawn through the openings. Preferably, the slot 48 lies between the openings 51, 54 as shown perpendicular to the aforesaid imaginary line. The second opening 54 may extend entirely through the sidewall.

By turning the screw 50 in its tightening direction, the free end 52 thereof will engage the threaded opening 54 and draw the opposing sidewall portions together toward the center of the collar 40. The screw 50 thereby applies in effect a clamping force onto the bolthead outer surfaces 39 by way of the collar body portion opposing sidewall portions. When the collar 40 is fully clamped in place on the bolthead 38, the slot 45 will deflect from its uniform open configuration illustrated in FIG. 2, to that illustrated in FIG. 4, where its ends are drawn together, thereby reducing the free space between the edges of the slot 45. In this regard, it is preferred that the slot 45 have a length $L_s$ that is greater than the distance $L_f$ from the collar end 42 to the centerline of the clamping screw 50. In order to provide a uniform clamping pressure on the bolthead 38, it is also preferred that the clamping screw 50 is aligned with the centerline of the collar 40.

Figure 6:
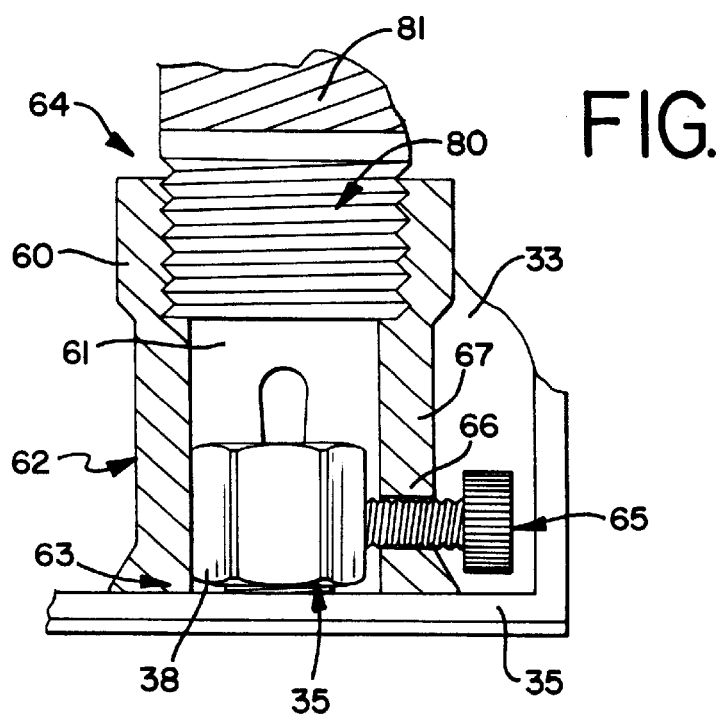
FIG. 6 is an enlarged detail view of a second embodiment of a mounting assembly constructed in accordance with the principles of the present invention and mounted in place upon a vehicle anchor bolt; and, FIG. 7 is the same view as FIG. 5, but also illustrating the mounting assembly of FIG. 2 in place thereon in conjunction with a telephone support member.

FIG. 6 illustrates another embodiment of the invention wherein the mounting member includes a cylindrical hollow socket member 60 having a central passage 61 that extends entirely through the body portion thereof 62 and between two opposing ends 63, 64 thereof. In this embodiment, the clamping screw 65 is more in the nature of a set screw in its operation which extends through an opening 66 formed in a sidewall 67 of the socket member 60. The clamping screw opening 66 is positioned so that the screw 65 will make direct contact with the outer surface 39 of the bolthead 38. This embodiment is particularly useful in applications where the anchor bolthead 38 is high enough that it extends into the central passage 61 where it extends beyond the opening that accommodates the clamping screw 65.

In both embodiments, the body portions may have an outwardly extending flange skirt portion that mates with an opposing surface of the seat baseplate 35. The diameter of the second end 43 of the mounting collar 40 may also be greater than that of the body portion 41 to provide additional engagement support for the telephone support member 81.

While the preferred embodiments of the invention have been shown and described, it will be apparent to those skilled in the art that changes and modifications may be made therein without departing from the spirit of the invention, the scope of which is defined by the appended claims. For example, although circular and cylindrical mounting members have been shown, it is contemplated that other, non-circular configurations may be utilized to achieve the same results.

What is claimed is:

1. A mounting element for mounting a telephone system to an interior compartment of a vehicle, the telephone system including a telephone and an elongated support member that positions the telephone off a floor of a vehicle, said vehicle further having at least one bolt affixed to the interior portion thereof, the bolt having a bolthead that is accessible from the vehicle interior compartment, the mounting element comprising:
    a socket member having an elongated socket body portion extending between first and second ends of the socket member, the socket body being defined in part by a sidewall, the first end of said socket body portion having a first opening that is sized to receive a mounting end of said elongated telephone support member, the second end of said socket body portion having a second opening that is configured to received the bolt therein; and,
    a clamping element passing through one portion of said socket body sidewall and engaging an opposing portion of said socket body sidewall, the clamping element being manipulatable by a user to apply a clamping force on said bolthead received within said socket body portion second opening.

2. The mounting element as defined in claim 1, wherein said clamping element includes a screw, and said socket body sidewall opposing portion includes a tapped opening that accommodates an end portion of said screw, said screw engaging said tapped opening of said socket body sidewall opposing portion and drawing said socket body sidewall portion and opposing portion toward each other when tightened.

3. The mounting element as defined in claim 2, further including a slot formed in said socket body portion, the slot extending lengthwise therein from said socket body portion second opening.

4. The mounting element as defined in claim 3, wherein said slot is angularly offset from said screw and is disposed in said socket body portion between said socket body portion first and second openings.

5. The mounting element as defined in claim 1, wherein said socket body portion is cylindrical and said sidewall is a continuous sidewall includes a slot and disposed between said socket body portion first and second openings, said slot further extending from said socket body second end for a preselected distance lengthwise of said socket body portion, and said clamping element includes a threaded member that passes through said socket body sidewall one portion and threadedly engages a tapped passage in said socket body sidewall opposing portion.

6. The mounting element as defined in claim 5, wherein said slot is angularly offset from said threaded member.

7. The mounting element as defined in claim 6, wherein said socket body portion includes third and forth openings respectively disposed in said socket body one and opposing portions, said threaded member extending through said socket body third opening and threadedly engaging said socket body forth opening.

8. The mounting element as defined in claim 1, wherein said socket body is cylindrical and said socket body first end has a diameter greater than a diameter of said socket body second end.

9. The mounting element as defined in claim 1, wherein said socket body first opening is threaded and said socket body second opening is hexagonal.

10. A mounting bracket for mounting to an interior compartment of a vehicle and for providing a base for an elongated support element suitable for supporting a telephone within said vehicle interior compartment, the vehicle interior compartment having at least one bolt disposed as a surface thereof, the bolt having a bolthead that protrudes out from said vehicle interior compartment surface and that is accessible from said vehicle interior compartment, said mounting bracket comprising;
    a cylindrical collar, the collar having a preselected length and including an elongated body portion that is defined by a cylindrical wall, the body portion having first and second opposing ends with respective first and second openings associated therewith, the collar body portion first opening being complementary in configuration to said vehicle interior compartment bolthead, such that said vehicle interior compartment bolthead may be received therein where said mounting bracket is applied to said vehicle interior compartment bolthead, the collar body portion second opening being configured to receive an end of said support element therein, and a clamping element passing through a third opening of said collar body portions that is disposed in said wall at a level such that said clamping element opposes said vehicle interior compartment bolthead when received in said collar body portion first opening, said clamping element being capable of being placed into contact with said vehicle interior compartment bolthead from outside of said mounting bracket to affix said mounting bracket to said vehicle interior compartment bolthead.

11. The mounting bracket as defined in claim 10, wherein said collar body portion first opening is hexagonal and said collar body portion second opening is threaded.

12. The mounting bracket as defined in claim 10, wherein said collar body portion third opening is threaded.

13. A mounting assembly for providing a support base for an elongated support member that in turn supports a cellular telephone assembly within an interior compartment of a vehicle, the interior compartment having at least one bolt with a bolthead accessible from within said interior compartment, the mounting-assembly comprising:
    a socket member of a preselected length, the socket member having a body portion extending between opposing first and second ends of said socket member, said body portion first and second ends respectively including first and second openings disposed therein, each of which extends axially within said body portion for respective preselected distances;
    said body portion first opening being configured to receive said bolthead therein and said body portion second opening being configured to receive said elongated support member therein;

said body portion further including third and fourth openings disposed at a preselected level therein, said third and fourth openings being aligned with each other and angularly offset from said body portion first and second openings, and a clamping element extending through said body portion third opening and engaging said body portion fourth opening; and, a slot disposed in said body portion extending lengthwise from said body portion first end at least to said level of said body portion third and fourth openings, said slot having a predetermined thickness that defines a free space between opposing edges of said body portion, whereby when said body portion first opening is placed over said bolthead, said clamping element may be tightened into engagement with said body portion fourth opening to thereby draw opposing portions of said body portion together and thereby exert a clamping force on said bolthead received within said body portion first opening, said slot partially closing while tightening said clamp element.

14. The mounting assembly as set forth in claim 13, wherein said body portion is generally cylindrical.

15. The mounting assembly as set forth in claim 13, wherein said body portion first and second openings have different dimensions.

16. The mounting assembly as set forth in claim 13, wherein said body portion first opening is hexagonal in configuration and said body portion second opening is circular in configuration.

17. The mounting assembly as set forth in claim 13, wherein said body portion slot extends past said level of said body portion third and fourth openings.

18. The mounting assembly as set forth in claim 13, wherein said body portion is generally cylindrical and said body portion is defined by a continuous sidewall that is partially interrupted by said slot, said body portion third and fourth openings being disposed in opposing portions of said sidewall, and said slot is disposed in said sidewall between said body portion third and fourth openings.

19. The mounting assembly as set forth in claim 18, wherein said body portion fourth opening is threaded and said clamping element is also threaded.

20. The mounting assembly as set forth in claim 19, wherein said body portion fourth opening is threaded and said clamping element is also threaded.

* * * * *